(12) United States Patent
Dunn et al.

(10) Patent No.: US 10,056,045 B2
(45) Date of Patent: *Aug. 21, 2018

(54) REDUNDANT CONTROL SYSTEM FOR LCD

(71) Applicant: American Panel Corporation, Alpharetta, GA (US)

(72) Inventors: William Dunn, Alpharetta, GA (US); David Williams, Alpharetta, GA (US); Hanwook Baek, Alpharetta, GA (US)

(73) Assignee: American Panel Corporation, Alpharetta, GA (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/237,450

(22) Filed: Aug. 15, 2016

(65) Prior Publication Data

US 2016/0358559 A1 Dec. 8, 2016

Related U.S. Application Data

(63) Continuation of application No. 13/735,856, filed on Jan. 7, 2013, now Pat. No. 9,418,603.

(60) Provisional application No. 61/583,275, filed on Jan. 5, 2012, provisional application No. 61/657,463, filed on Jun. 8, 2012, provisional application No. 61/711,804, filed on Oct. 10, 2012.

(51) Int. Cl.
*G02F 1/1362* (2006.01)
*G09G 3/34* (2006.01)
*G09G 3/36* (2006.01)

(52) U.S. Cl.
CPC ......... *G09G 3/3426* (2013.01); *G09G 3/3413* (2013.01); *G09G 3/36* (2013.01); *G09G 3/3648* (2013.01); *G02F 1/136259* (2013.01); *G09G 3/3666* (2013.01); *G09G 2300/0452* (2013.01); *G09G 2310/0224* (2013.01); *G09G 2310/0281* (2013.01); *G09G 2320/0626* (2013.01); *G09G 2320/0693* (2013.01); *G09G 2330/08* (2013.01)

(58) Field of Classification Search
CPC .............. G06T 1/20; G09G 2310/0281; G09G 2330/08; G09G 2320/0693; G02F 1/136259
USPC ........ 345/204, 501, 30, 55, 84, 93, 102, 205
See application file for complete search history.

(56) References Cited

U.S. PATENT DOCUMENTS

| | | | |
|---|---|---|---|
| 4,922,240 A | 5/1990 | Duwaer | |
| 5,555,001 A | 9/1996 | Lee et al. | |
| 7,710,253 B1 * | 5/2010 | Fredricks | B60Q 11/005 315/76 |
| 7,724,259 B2 | 5/2010 | Hedrick et al. | |
| 7,728,788 B1 | 6/2010 | Echols et al. | |
| 8,745,366 B2 | 6/2014 | Wyatt et al. | |
| 2003/0025658 A1 | 2/2003 | Janssen et al. | |

(Continued)

*Primary Examiner* — Jacinta M Crawford
(74) *Attorney, Agent, or Firm* — Standley Law Group LLP

(57) ABSTRACT

In an exemplary embodiment, each horizontal and vertical conductor of a TFT array may be in electrical contact with a first and second control system. Initially, the entire display is driven by the first control system. When/if a failure occurs in the first control system, it is powered down and the second control system maintains operation of the entire display. Each control system may contain a set of source/gate drivers, display interface board, and power supply. A reversionary button may allow the user to manually switch between control systems. Alternatively, failure may be detected by the display interface boards or a graphics processor.

16 Claims, 9 Drawing Sheets

(56) References Cited

U.S. PATENT DOCUMENTS

| | | |
|---|---|---|
| 2004/0066146 A1 | 4/2004 | Park et al. |
| 2005/0024971 A1 | 2/2005 | Lambert |
| 2007/0159750 A1* | 7/2007 | Peker ................. H05B 33/0869 |
| | | 361/93.1 |
| 2007/0182909 A1 | 8/2007 | Kim et al. |
| 2009/0015574 A1* | 1/2009 | Kim ..................... G09G 3/3688 |
| | | 345/208 |
| 2009/0135093 A1 | 5/2009 | Keuenhof |
| 2010/0327955 A1* | 12/2010 | Umezaki ................. G09G 3/20 |
| | | 327/520 |
| 2011/0018910 A1 | 1/2011 | Chai et al. |
| 2011/0148825 A1 | 6/2011 | Ueno |
| 2011/0254822 A1 | 10/2011 | Anzai et al. |

\* cited by examiner

REDUNDANT CONTROL SYSTEM FOR LCD

CROSS-REFERENCE TO RELATED APPLICATIONS

This application is a continuation of U.S. patent application Ser. No. 13/735,856 filed on Jan. 7, 2013, which claims priority to U.S. Provisional Patent Application Nos. 61/583,275 filed on Jan. 5, 2012, 61/657,463 filed on Jun. 8, 2012, and 61/711,804 filed on Oct. 10, 2012; each application is herein incorporated by reference in its entirety.

TECHNICAL FIELD

Disclosed embodiments relate generally to a redundant interwoven TFT array for a liquid crystal display device.

BACKGROUND OF THE ART

LCDs are becoming popular for not only home entertainment purposes, but are now being used as informational/advertising displays in both indoor and outdoor locations as well as within moving vehicles subject to substantial shock. When used for information/advertising purposes, the displays may remain 'on' for extended periods of time and thus would see much more use than a traditional home theatre use. When used for extended periods of time and placed within vehicles subject to shock, durability of the components can become an issue.

Liquid Crystal Displays (LCDs) contain several layers which work in combination to create a viewable image. A backlight is used to generate the rays of light that pass through what is commonly referred to as the LCD stack, which typically contains several layers that perform either basic or enhanced functions. The most fundamental layer within the LCD stack is the liquid crystal material, which may be actively configured in response to an applied voltage/charge in order to pass or block a certain amount of light which is originating from the backlight. The layer of liquid crystal material is divided into many small regions which are typically referred to as pixels. For full-color displays these pixels (color groups) are typically divided into independently-controllable regions of red, green and blue subpixels, where the red subpixel has a red color filter, blue subpixel has a blue color filter, and green subpixel has a green color filter. Each subpixel may be controlled by a grid of intersecting conductors which can apply a specific voltage to each subpixel to create an image.

An LCD will not function satisfactorily without an appropriate and properly-functioning set of source and gate drivers and associated conductor lines. If a conductor were to fail, then the entire column or row of the LCD may cease operations. Further, if either the gate driver, source driver, or the power supply to either of these drivers were to fail, the entire LCD may fail to create an image. While this may be a simple inconvenience when LCDs are used for entertainment purposes, when used for information or data displays this can be very costly. For example, LCDs are now being used in aircraft cockpits as well as the instrument panels or display(s) in ground vehicles and marine equipment. In these applications, when there is a failure within the control system, the LCD may no longer display the important information for the vehicle/aircraft and controls may cease to operate. These situations can be undesirable not only to the passengers of the vehicle/aircraft, but also other soldiers/team members who are counting on this part of the mission.

Some control systems have a limited life span, and eventually their performance may suffer. Some systems may quickly fail simply due to a manufacturing defect or may fail due to shock/forces applied to the aircraft or ground vehicle. Currently when this occurs, the entire LCD device must be manually replaced. This is expensive, and is often time consuming. Alternatively, the LCD device could be removed from the display housing, and the degraded or faulty system elements could be manually replaced. This is typically even more costly, and involves extensive manual labor. In currently known units, this also requires virtual complete disassembly of the LCD to gain access to the electronics. This complete disassembly is not only labor intensive, but must be performed in a clean room environment and involves the handling of expensive, delicate, and fragile components that can be easily damager or destroyed, even with the use of expensive specialized tools, equipment, fixtures, and facilities.

SUMMARY

Exemplary embodiments provide a redundant interwoven TFT array for an LCD device where the odd horizontal conductors are driven by a first gate driver while the even horizontal conductors are driven by a second gate driver. Further, the odd vertical conductors are driven by a first source driver while the even vertical conductors are driven by a second source driver. Separate DIB and power supplies may be used for the first and second set of gate/source drivers. If a failure were to occur, one set of source/gate drivers may be turned off, causing only every other line of pixels to cease operation, while the remaining pixels continue to operate. When the redundant interwoven TFT array is manufactured at a high density, the loss of every other line of pixels may not be noticeable to the observer. Any loss in luminance due to the failure of every other line of pixels can be accounted for by increasing the backlight power/luminance.

In another embodiment, each horizontal and vertical conductor may be in electrical contact with a first and second control system. Initially, the entire display is driven by the first control system. When/if a failure occurs in the first control system, it is powered down and the second control system maintains operation of the entire display.

An exemplary TFT array and LCD thus continues to produce images even after a failure of a gate/source driver, DIB, power supply, or conductor. If the TFT array is applied densely enough, the failure will not be noticeable to an observer.

DETAILED DESCRIPTION

Figure 1:
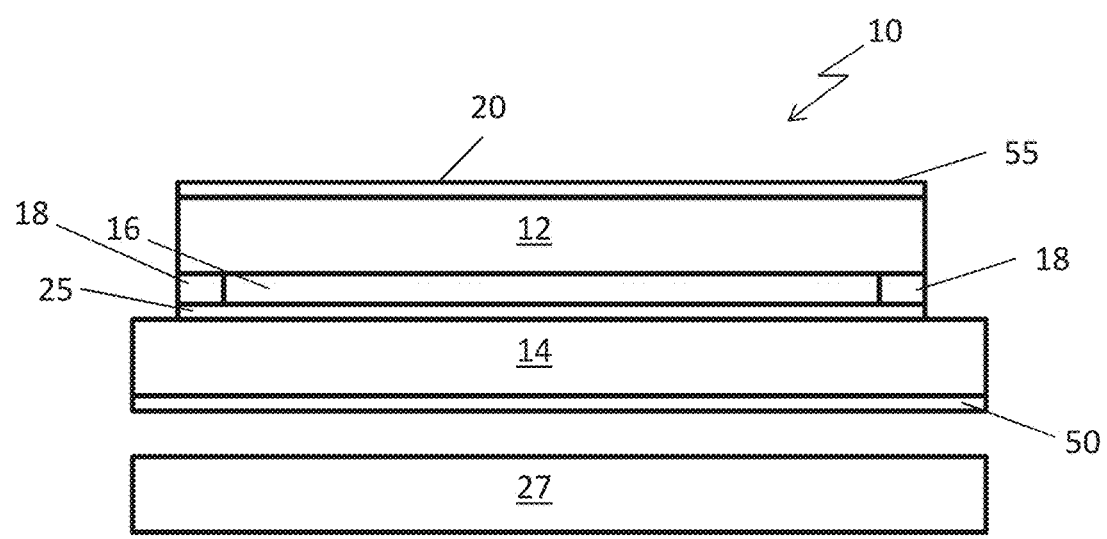
FIG. 1 provides a side elevational view of a traditional liquid crystal display device.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Much of the detail for constructing a flat panel liquid crystal display (LCD) 10, as shown in side sectional view in FIG. 1, is known in the art and is unaffected by the exemplary embodiments, so that detail is not repeated here. For purposes of this application, the relevant details of the exemplary embodiments are typically located between the front and rear plates 12, 14 of the liquid crystal display 10. Both front plate 12 and rear plate 14 are visually transparent. Both are typically constructed of glass and provide the conventional rigidity. In the applicable art, front plate 12 is generally referred to as the "color filter" (CF) plate, and rear plate 14 is generally referred to as the "thin film transistor" (TFT) plate. According to known principles of the relevant art, a layer of liquid crystal material is contained in a thin cavity 16 maintained between the plates 12, 14 by a sealing adhesive 18 that extends around a periphery of the plates.

By known principles, electrical interaction of the respective plates 12, 14 with the liquid crystal material causes localized alignment of the liquid crystal material in cavity 16. This alignment affects the transmissibility of the backlight 27 through the plates 12, 14 at that localized point. A display area visible through an external face 20 of the LCD 10 is effectively divided into a large plurality of pixels or color groups. In one known arrangement, the pixels or color groups are further divided into red, green and blue sub-pixels. The close proximity of the sub-pixels allows them to co-act to provide a visual perception of a single pixel in one of literally thousands of color variations that can be achieved through combinations of intensity of the aforementioned three colors. Of course, other designs are possible which may use red, green, blue, and yellow sub-pixels and these would be within the scope of the exemplary embodiments. Further, some arrangements may use two of the same color sub-pixels, such as red, green, first blue, and second blue sub-pixels, and this would also be within the scope of the exemplary embodiments. Any number, color, and pairings of sub-pixels would be within the scope of the exemplary embodiments. Further, any type of backlight 27 may be used with the exemplary embodiments, including but not limited to edge-lit, direct-lit, or a hybrid type of design. Embodiments could also be used with LCD's that are not back-lit and instead rely on reflected ambient light to create an image.

The intensity variations of each sub-pixel are achieved through the selective alignment and non-alignment of the liquid crystal material immediately adjacent to the sub-pixels. Specifically, the TFT array 25, when activated, act upon the liquid crystal material to change the polarization plane of the liquid crystal material. The interaction of the liquid crystal material with the front polarizer 55 and rear polarizer 50 alters the emission intensity of each sub-pixel to create the overall color of light emitted by the color group or pixel.

Figure 2:
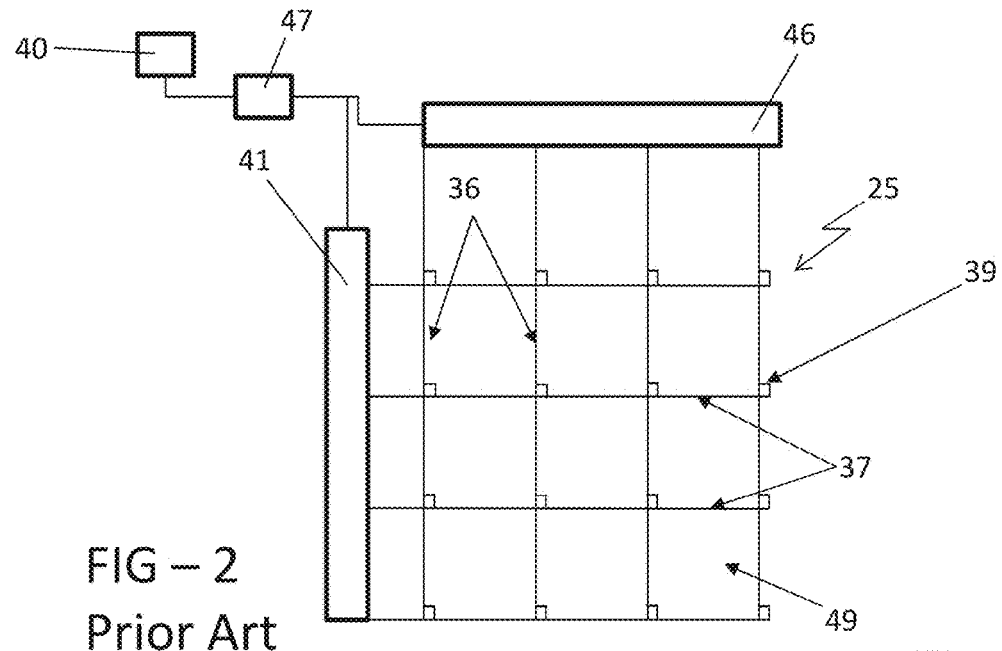
FIG. 2 illustrates a simplified and enlarged elevational view of a traditional TFT array if viewed from the perspective of an intended observer.

FIG. 2 illustrates a simplified and enlarged view of traditional TFT array 25 if viewed from the perspective of an intended observer. A plurality of horizontal conductors 37 are arranged with a plurality of vertical conductors 36 to create a plurality of sub-pixels 49. As known in the art, a transistor 39 is preferably placed within each sub-pixel 49. A gate driver 41 is in electrical communication with a display interface board (DIB) 47 and is used to control the horizontal conductors 37. A source driver 46 is also in electrical communication with the DIB 47 and is used to control the vertical conductors 36. A power supply 40 may provide power through the DIB 47 to the gate driver 41 and source driver 46. Each sub-pixel 49 in the assembly can be controlled when the gate driver 41 activates the appropriate horizontal conductor 37 while the source driver 46 activates the corresponding vertical conductor 36.

As FIG. 2 illustrates, the TFT array of 25 requires the operation of source driver 46, gate driver 41, DIB 47, and power supply 40 to orient the sub-pixels 49 and create and image. If any of these devices were to fail, then the entire LCD would fail to create an image. This is sometimes referred to as a 'single point failure.' As discussed above, the failure of the entire LCD is undesirable but has traditionally been a significant risk for LCD displays.

Figure 3:
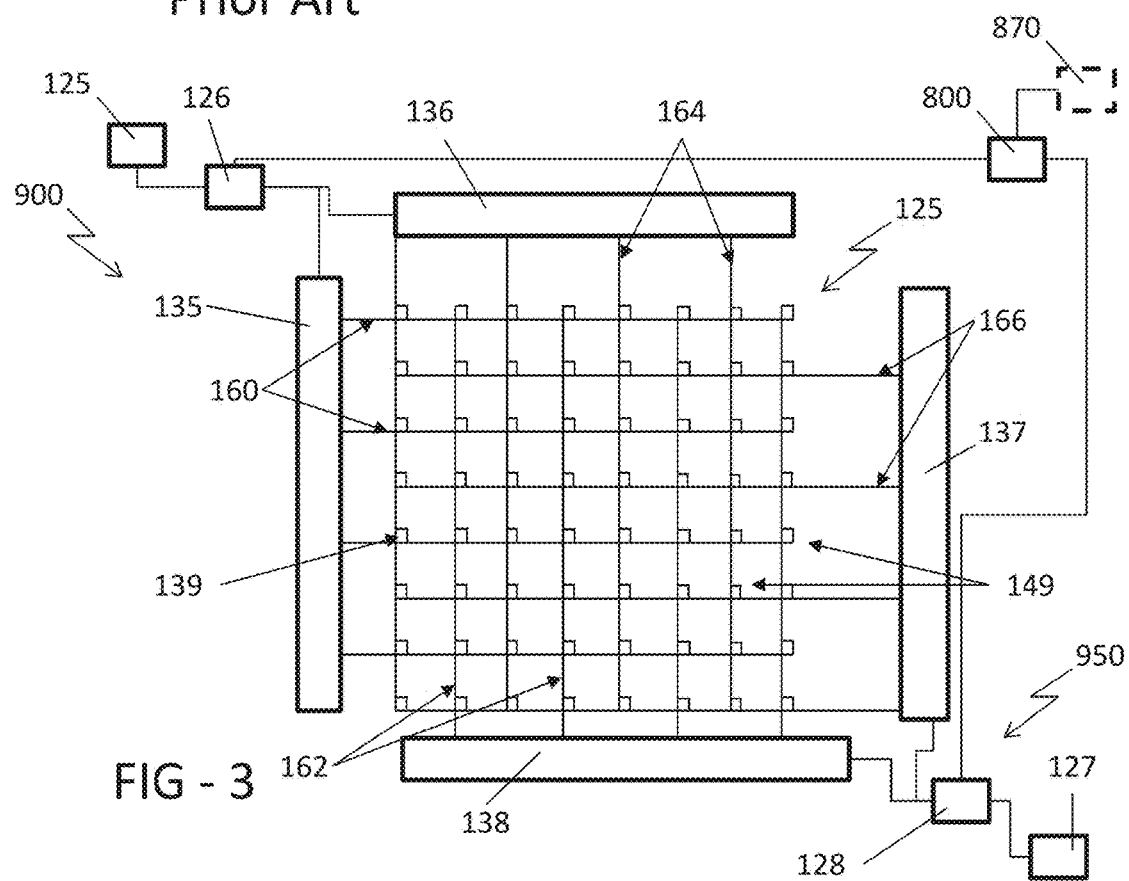
FIG. 3 illustrates a simplified and enlarged view of an embodiment of the interwoven redundant TFT array if viewed from the perspective of an intended observer.

FIG. 3 illustrates a simplified and enlarged view of an exemplary embodiment of the TFT array if viewed from the perspective of an intended observer. Herein the terms 'odd' and 'even' will be used to describe alternating conductors where the numerical counting begins in the upper left hand corner of the TFT array. The terms 'odd' and 'even' are simply used to denote the alternating pattern, and do not require any specific number of conductors or counting scheme. Further, the terms 'horizontal' and 'vertical' will be used to describe the conductors but these do not require the specific orientation as it is known that LCD's may be rotated 90 degrees. In other words, the gate drivers herein may be used to control vertical conductors and the source drivers may be used to control horizontal conductors or vice versa.

In this embodiment a first gate driver 135 is used to control the odd horizontal conductors 160 while a second gate driver 137 is used to control the even horizontal conductors 166. Similarly, a first source driver 136 is used to control the odd vertical conductors 164 while a second source driver 138 is used to control the even vertical conductors 162. A first DIB 126 is in electrical communication with the first gate driver 135 and first source driver 136. A first power supply 125 provides power through the DIB 126 and to the first gate and source drivers 135 and 136. A second DIB 128 is in electrical communication with the second gate driver 137 and second source driver 138. A second power supply 127 provides power through the DIB 128 and to the second gate and source drivers 137 and 138.

During normal operations, both sets of conductors 160/164 and 162/166 and their associated components would operate simultaneously. In at least one embodiment, both sets of conductors and their associated components would be generating the same image. If the horizontal conductors 160, vertical conductors 164, first gate driver 135, first source driver 136, DIB 126, or power supply 125 were to fail, these components (known herein as the first TFT assembly 900) would be turned off or powered down. Conversely, if the horizontal conductors 166, vertical conductors 162, second gate driver 137, second source driver 138, DIB 128, or power supply 127 were to fail, these components (known herein as the second TFT assembly 950) would be turned off or powered down. If the first TFT assembly 900 were turned off, the second TFT assembly 950 may continue to create the image on the LCD. Conversely, if the second TFT assembly 950 were turned off, the first TFT assembly 900 may continue to create the image on the LCD.

The intersection of conductors 160, 164, 162, and 166 create a plurality of sub-pixels 149, each of which preferably contains a transistor 139. Depending on the resolution of the TFT array (i.e. how densely are the conductors laid out) and the specific application for the LCD (i.e. what is being shown graphically) the loss of every other conductor may not be noticeable to the observer. It has been found that modern manufacturing techniques allow the resolution of the TFT array to be constructed sufficiently high so that a loss of every other line is not noticeable to the observer. For example, high resolution TFT arrays (over 300 pixels per inch (ppi)) may lose every other conductor line which would result in about half the resolution (approximately 150 ppi) and despite the application; this may not be noticeable to the user. In medium resolution displays (approximately 150 ppi), this may be slightly noticeable to the observer, depending on the application of the LCD. While it is estimated that the human eye may only be able to perceive resolutions up to 300 ppi, modern manufacturing techniques have shown that TFT arrays can be constructed as high as 325 ppi and very possibly higher. Thus, while the human eye may not perceive the full resolution of an exemplary TFT array in full operation, a failure in any of the source/gate drivers, power supplies, or conductors may not result in any noticeable loss of resolution to the observer.

Figure 4:
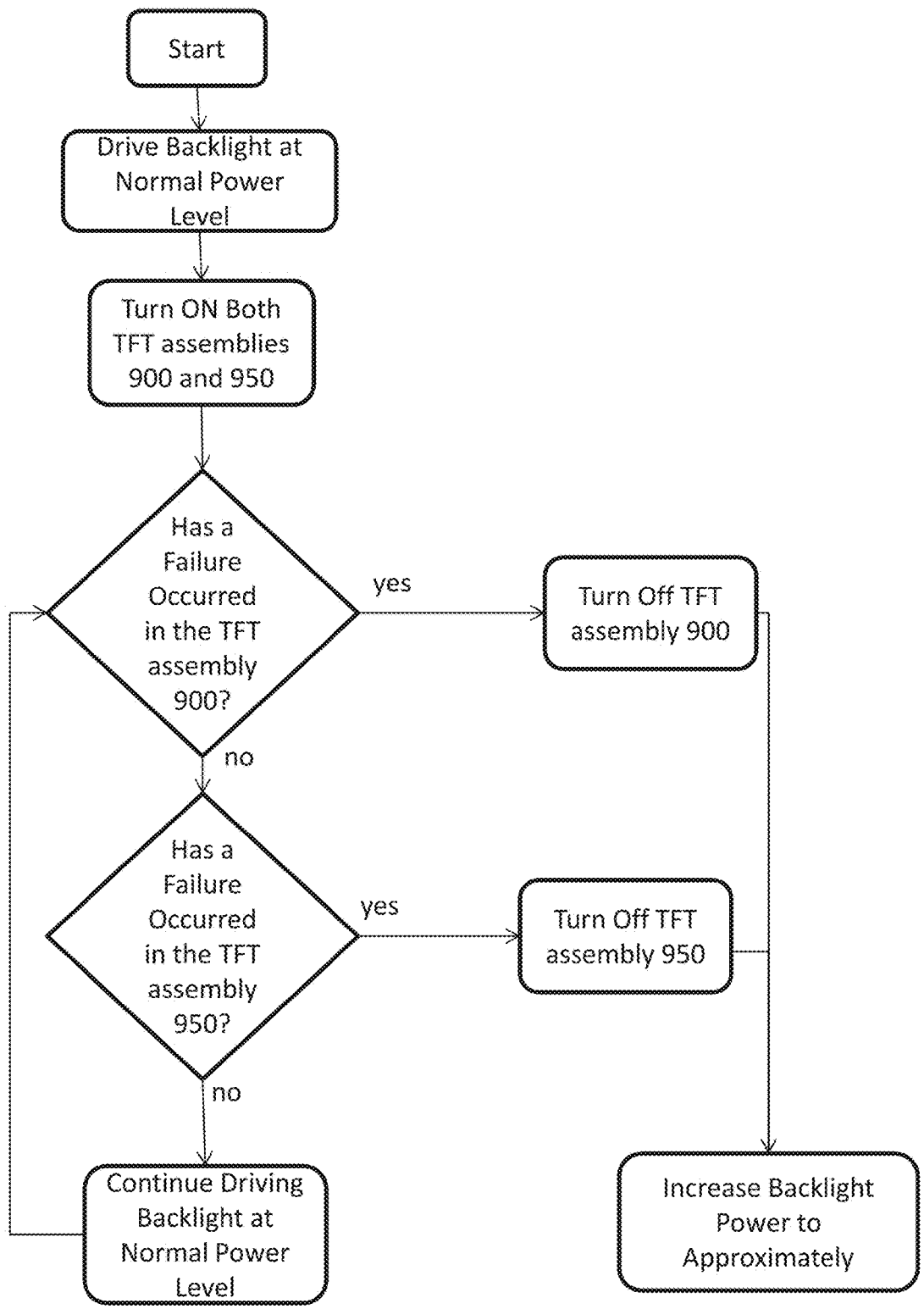
FIG. 4 provides a logical flow chart for an exemplary method for controlling the luminance of the display based on backlight power after a failure of a gate/source driver, power supply, or conductor.

It has been found that while the change in resolution may not be noticeable to the observer, the display luminance may drop noticeably when either the first 900 or second 950 TFT assembly is turned off. To account for this phenomenon, an exemplary system may detect when a failure has occurred and may increase the backlight to account for the change in display luminance. This process is illustrated in FIG. 4.

In some embodiments, the DIB 126 and DIB 128 contain built-in-test (BIT) circuitry, which may detect a failure in one of the TFT assembly components and cause the TFT assembly containing the failure to be turned off. In some embodiments, a graphics processor 800 may be placed in electrical communication with the DIB 126 and DIB 128. The graphics processor 800 may contain BIT circuitry, either instead of or in addition to the BIT circuitry found in DIB 126 and DIB 128. To determine if there is a failure within a source or gate driver, the BIT circuitry may monitor the ripple carry outputs of the source and gate drivers and report a failure upstream, possibly to the graphics processor 800, which may then turn off the TFT assembly containing the failure. In other embodiments, the failure may not be detected by BIT circuitry and may be detected by the observer who can manually select an optional reversionary button 870 to turn off the failed TFT assembly. The reversionary button 870 may also accept input from the observer, so as to cycle through several modes including but not limited to: both first and second TFT assemblies 900 and 950 (1× backlight), only first TFT assembly 900 (2× backlight), only second TFT assembly 950 (2× backlight).

In some techniques, the backlight is controlled using a power feedback loop, where the power to the backlight is controlled based on measurements of current and/or power and these measurements are monitored by a feedback loop. For these techniques, the desired power is roughly doubled when the system or observer detects a failure and one of the TFT assemblies is turned off. This embodiment is illustrated in FIG. 4, which provides a logical flowchart that can be executed by many types of software drivers or microprocessors. In some embodiments, the logic illustrated in FIG. 4 may be operated by the graphics processor 800.

In other techniques, the backlight may be controlled using a luminance feedback loop, where the luminance within the backlight cavity is controlled based on luminance measurements from a light sensor placed within the cavity and monitored through an electrical feedback loop. For these techniques, the desired luminance may be roughly doubled when the system detects a failure and turns off the TFT assembly containing the failure.

Unlike traditional digital binary logic buffers which can be tri-stated to selectively allow a single output from multiple tri-state buffered output signals to interface to a single electrical wire or trace, LCD source drivers are analog based which are traditionally not capable of being tri-stated. Furthermore, even in a powered down state, back-driving a source/gate driver could result in permanent damage to the powered-down source/gate driver or improper operation of the LCD. The preferred embodiment is to incorporate a logic switch or circuit on the TFT matrix which effectively electrically isolates the two source/gate drivers. A second embodiment is to incorporate this logic switch or circuit in the source/gate drive IC.

Figure 5:
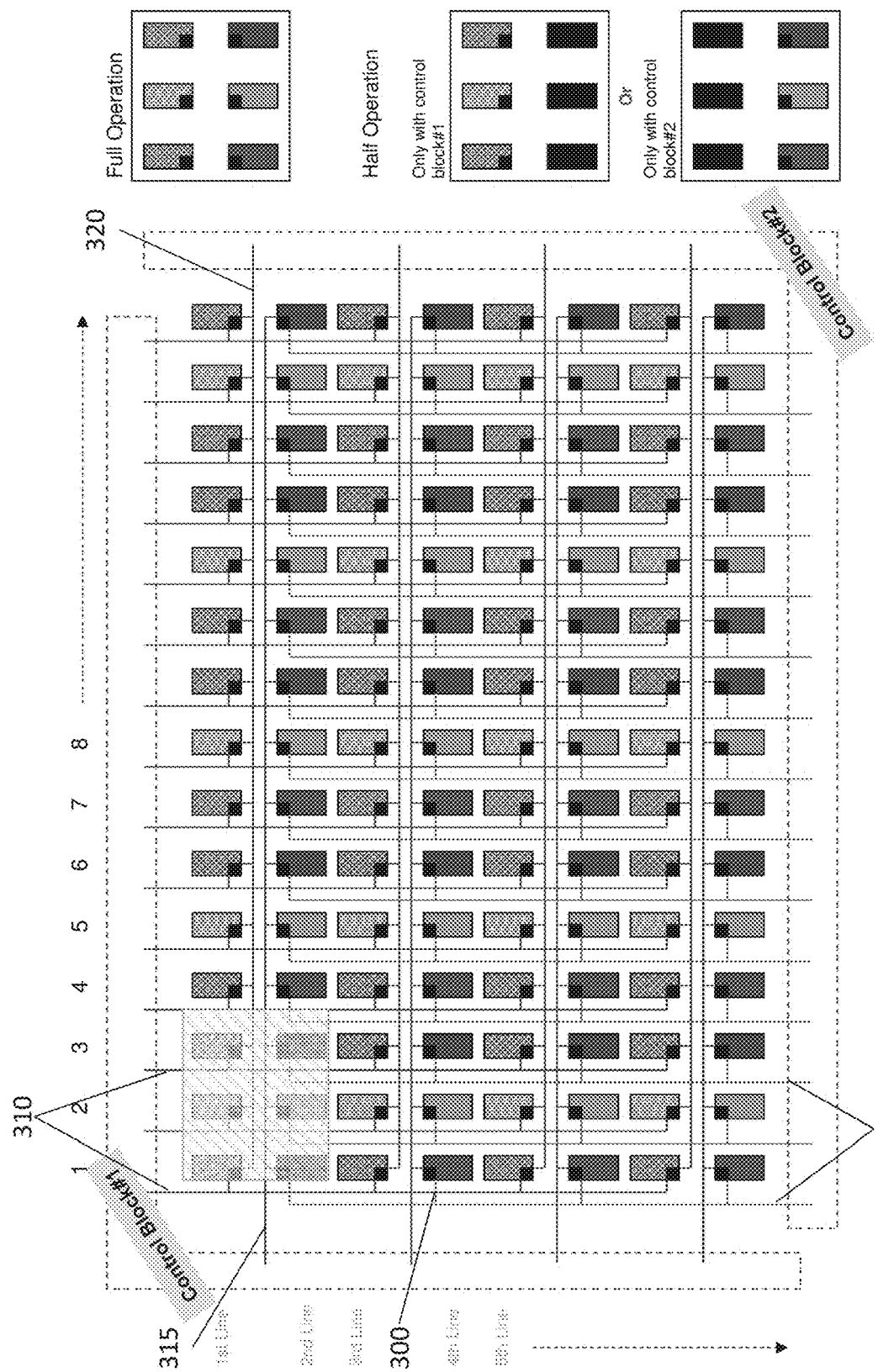
FIG. 5 illustrates a simplified and enlarged view of another embodiment of the interwoven redundant TFT array if viewed from the perspective of an intended observer.

FIG. 5 illustrates a simplified and enlarged view of another embodiment of the interwoven redundant TFT array if viewed from the perspective of an intended observer. In this embodiment, control block 1 is controlling every even horizontal row of subpixels through horizontal conductors 315. As used herein, every even horizontal row of subpixels is considered to be the $2^{nd}$ line, $4^{th}$ line, etc. Control block 2 is controlling every odd horizontal row of subpixels through horizontal conductors 320. As used herein, every odd horizontal row of subpixels is considered to be the $1^{st}$ line, $3^{rd}$ line, $5^{th}$ line, etc.

Control block 1 also has a plurality of vertical conductors 310 which control every odd horizontal row of subpixels. Control block 2 also has a plurality of vertical conductors 305 which control every even horizontal row of subpixels. Also it should be noted that each of the horizontal conductors 315 and 320 are positioned immediately below the odd rows of subpixels. Also, there are no horizontal conductors placed below the even rows of subpixels. Here, it can be observed that during full operation, both control blocks 1 and 2 are operating so that every subpixel is active. If control block 2 were to fail, then only the odd rows of subpixels would be active. If control block 1 were to fail, then only the even rows of subpixels would be active. Because of the intersection 300, more than one source layer may be required.

Figure 6:
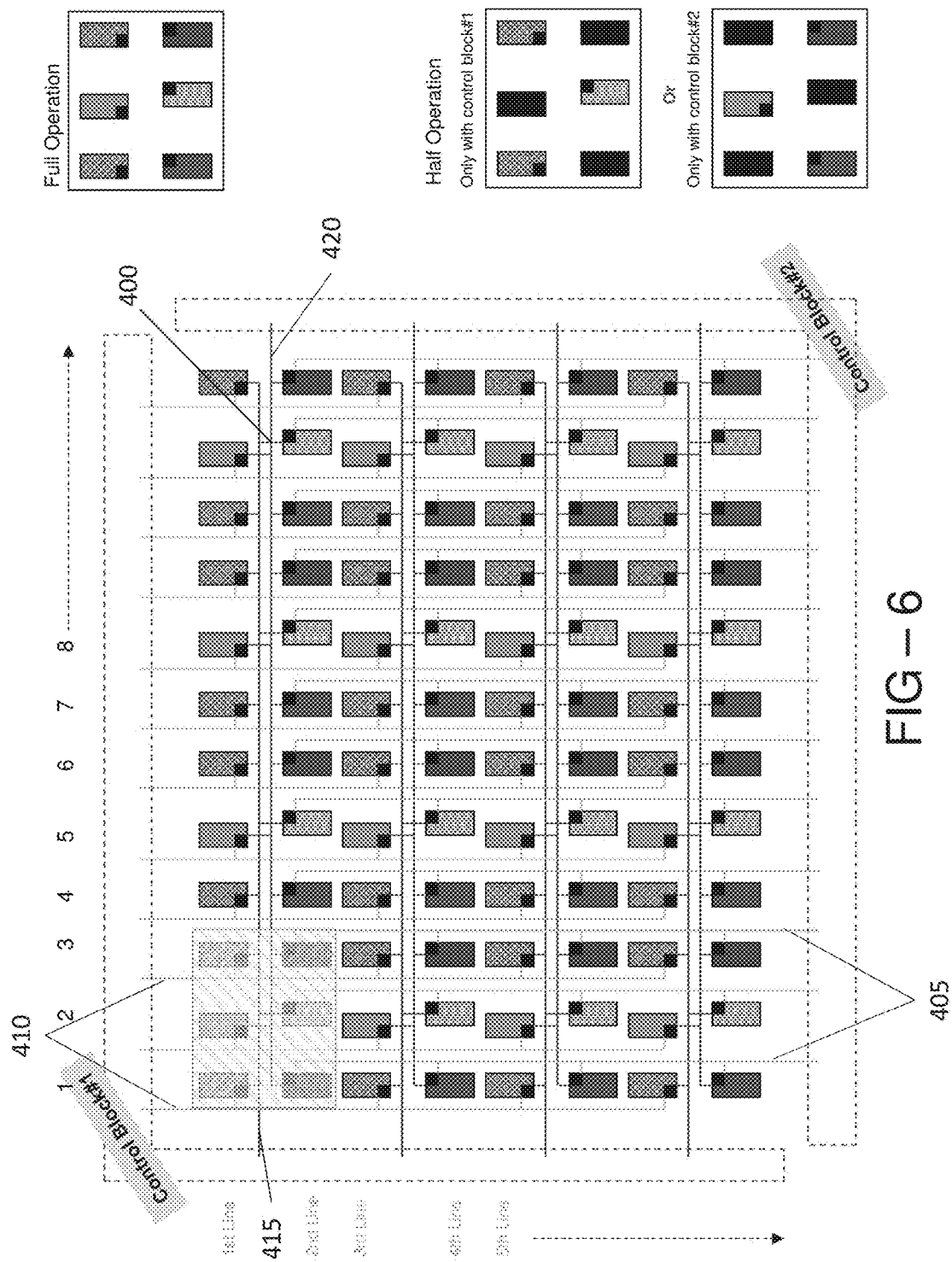
FIG. 6 illustrates a simplified and enlarged view of another embodiment of the interwoven redundant TFT array if viewed from the perspective of an intended observer.

FIG. 6 illustrates a simplified and enlarged view of another embodiment of the interwoven redundant TFT array if viewed from the perspective of an intended observer. In this embodiment, control block 1 is controlling every odd horizontal row of subpixels through horizontal conductors 415. Control block 2 is controlling every even horizontal row of subpixels through horizontal conductors 420. As used herein, every odd horizontal row of subpixels is considered to be the $1^{st}$ line, $3^{rd}$ line, $5^{th}$ line, etc.

Control block 1 also has a plurality of vertical conductors 410 which control every odd horizontal row of subpixels. Control block 2 also has a plurality of vertical conductors 405 which control every even horizontal row of subpixels. Also it should be noted that each of the horizontal conductors 415 and 420 are positioned immediately below the odd rows of subpixels. Also, there are no horizontal conductors placed below the even rows of subpixels. Here, it can be observed that during full operation, both control blocks 1 and 2 are operating so that every subpixel is active. If control block 2 were to fail, then control block 1 would power only half of the remaining subpixels. If control block 1 were to fail, then control block 2 would power only half of the remaining subpixels. Because of the intersection 400, more than one source layer may be required.

Figure 7:
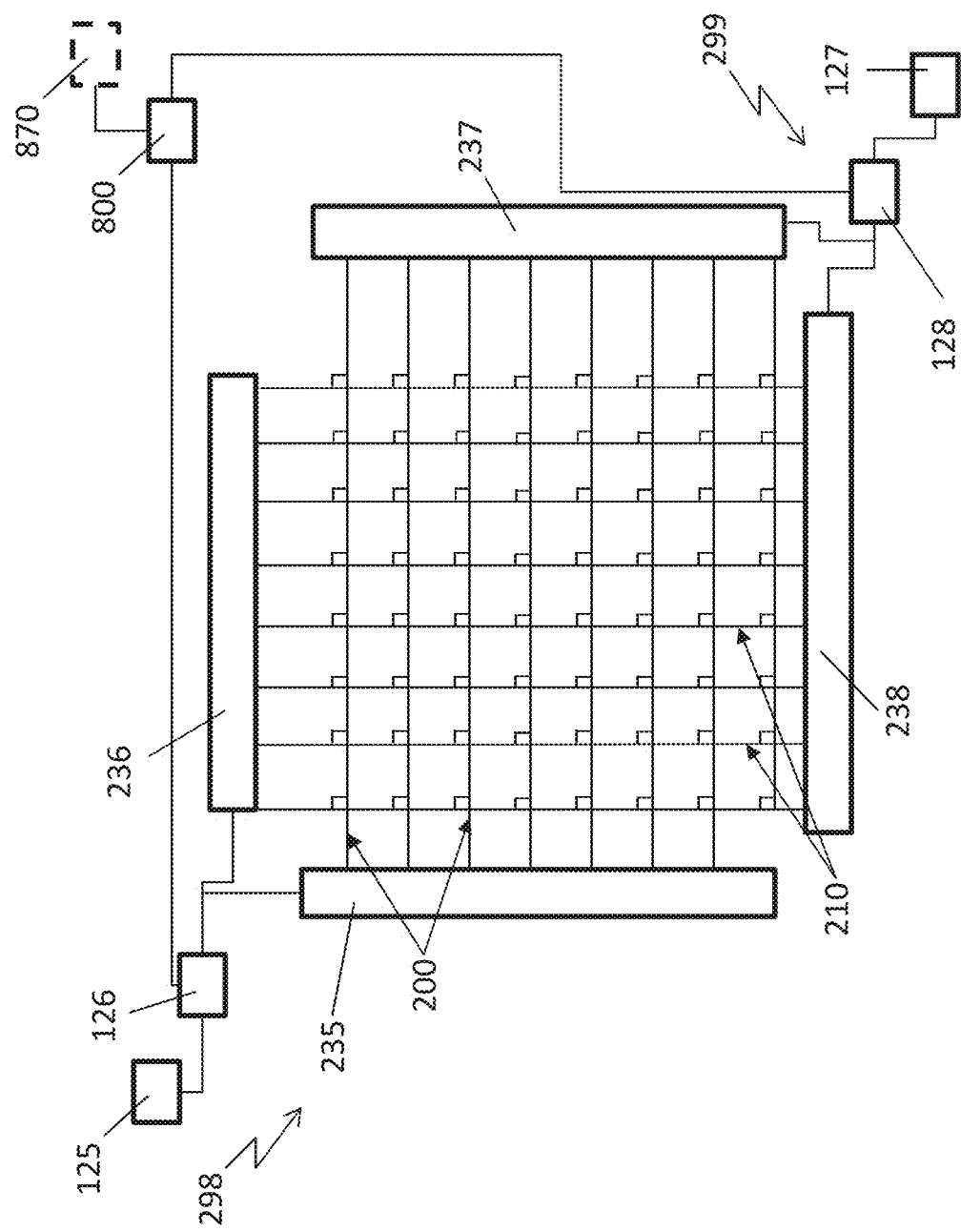
FIG. 7 illustrates a simplified and enlarged view of another embodiment of the interwoven redundant TFT array if viewed from the perspective of an intended observer.

FIG. 7 illustrates a simplified and enlarged view of another embodiment of the interwoven redundant TFT array if viewed from the perspective of an intended observer. In this embodiment, gate 235 and source 236 are able to control every subpixel through horizontal conductors 200 and vertical conductors 210. Further, gate 237 and source 238 are also able to control every subpixel through horizontal conductors 200 and vertical conductors 210. In this embodiment, if gate 235 or source 236 were to fail, all of the subpixels could still be controlled by gate 237 and source 238. Alternatively, if gate 237 and source 238 were to fail, all of the subpixels could still be controlled by gate 235 or source 236.

In this embodiment, a first DIB 126 is in electrical communication with the first gate driver 235 and first source driver 236. A first power supply 125 provides power through the DIB 126 and to the first gate and source drivers 235 and 236. A second DIB 128 is in electrical communication with the second gate driver 237 and second source driver 238. A second power supply 127 provides power through the DIB 128 and to the second gate and source drivers 237 and 238.

Figure 8:
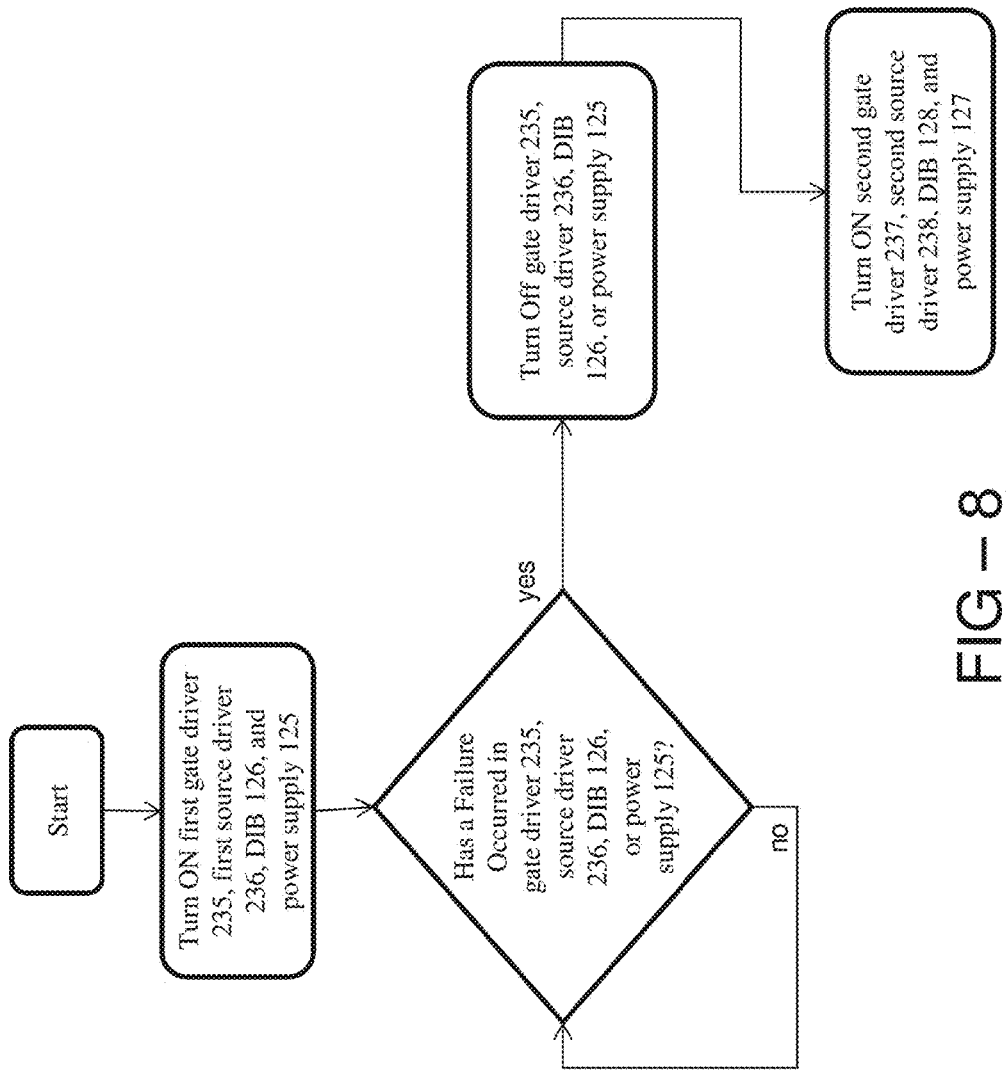
FIG. 8 provides a logical flow chart for an exemplary method for controlling the redundant TFT array system shown in FIG. 7.

FIG. 8 provides a logical flow chart for an exemplary method for controlling the redundant TFT array system shown in FIG. 7. If the first gate driver 235, first source driver 236, DIB 126, or power supply 125 were to fail, these components (known herein as the first control assembly 298) would be turned off or powered down. Conversely, if the second gate driver 237, second source driver 238, DIB 128, or power supply 127 were to fail, these components (known herein as the second control assembly 299) would be turned off or powered down. If the first control assembly 298 were turned off, the second control assembly 299 may continue to create the image on the LCD. Conversely, if the second control assembly 299 were turned off, the first control assembly 198 may continue to create the image on the LCD.

In some embodiments, the DIB 126 and DIB 128 contain built-in-test (BIT) circuitry, which may detect a failure in one of the TFT assembly components and cause the TFT assembly containing the failure to be turned off. In some embodiments, a graphics processor 800 may be placed in electrical communication with the DIB 126 and DIB 128. The graphics processor 800 may contain BIT circuitry, either instead of or in addition to the BIT circuitry found in DIB 126 and DIB 128. To determine if there is a failure within a source or gate driver, the BIT circuitry may monitor the ripple carry outputs of the source and gate drivers and report a failure upstream, possibly to the graphics processor 800, which may then turn off the TFT assembly containing the failure. In other embodiments, the failure may not be detected by BIT circuitry and may be detected by the observer who can manually select an optional reversionary button 870 to turn off the failed TFT assembly.

Figure 9:
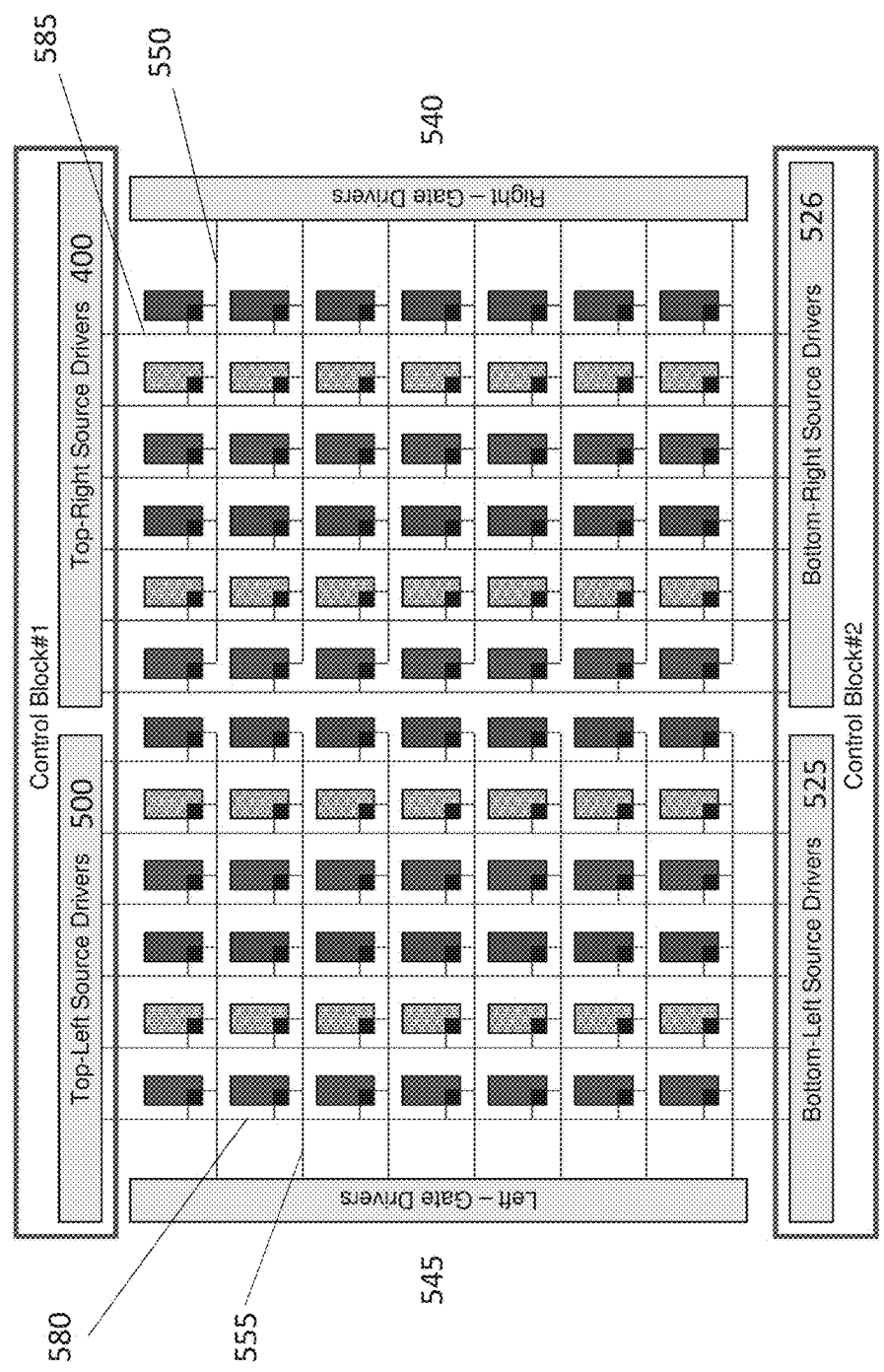
FIG. 9 illustrates a simplified and enlarged view of another embodiment of the interwoven redundant TFT array if viewed from the perspective of an intended observer.

FIG. 9 illustrates a simplified and enlarged view of another embodiment of the interwoven redundant TFT array if viewed from the perspective of an intended observer. In this embodiment, control block 1 is split into top-left source drivers 500 and top-right source drivers 400. Further, control block 2 is split into bottom-left source drivers 525 and bottom-right source drivers 526. The subpixels on the left hand side of the display can be controlled by the left-gate drivers 545 through the horizontal conductors 555. The subpixels on the left hand side of the display can also be controlled by either the top-left source drivers 500 or the bottom-left source drivers 525 through the vertical conductors 580. Similarly, the subpixels on the right hand side of the display can be controlled by the right-gate drivers 540 through the horizontal conductors 550. The subpixels on the right hand side of the display can also be controlled by either the top-right source drivers 400 or the bottom-right source drivers 526 through the vertical conductors 585.

Here, if the top-left source drivers 500 were to fail, the subpixels on the left side of the display could still be controlled by the bottom-left source drivers 525, and vice versa. Further, if the top-right source drivers 400 were to fail, the subpixels on the right hand side of the display could still be controlled by the bottom-right source drivers 526, and vice versa.

Figure 10:
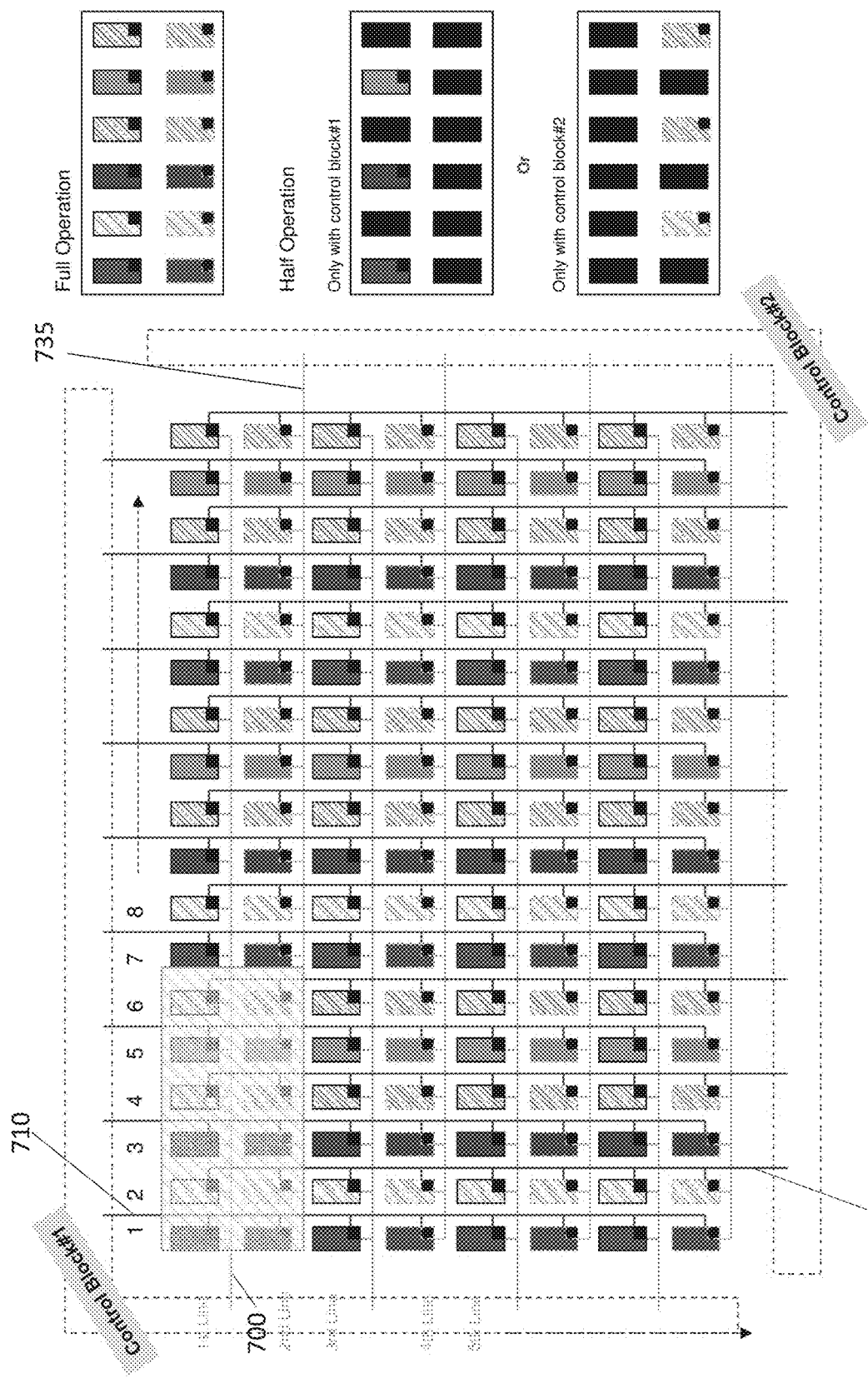
FIG. 10 illustrates a simplified and enlarged view of another embodiment of the interwoven redundant TFT array if viewed from the perspective of an intended observer.

FIG. 10 illustrates a simplified and enlarged view of another embodiment of the interwoven redundant TFT array if viewed from the perspective of an intended observer. Here, every odd horizontal row of subpixels is controlled by control block 1 through horizontal conductors 700. Further, every odd column of subpixels is controlled by control block 1 through vertical conductors 710. Similarly, every even horizontal row of subpixels is controlled by control block 2 through horizontal conductors 735. Finally, every even column of subpixels is controlled by control block 2 through vertical conductors 725.

In this embodiment, if control block 1 were to fail, control block 2 could continue to drive 25% of the available subpixels. If control block 2 were to fail, control block 1 could continue to drive 25% of the available subpixels.

Having shown and described preferred embodiments of the invention, those skilled in the art will realize that many variations and modifications may be made to affect the described embodiments and still be within the scope of the claimed invention. Additionally, many of the elements indicated above may be altered or replaced by different elements which will provide the same result and fall within the spirit of the exemplary embodiments.

We claim:

1. A redundant control system for a TFT array comprising:
a plurality of horizontal conduction lines;
a first gate driver in electrical contact with every odd numbered horizontal conduction line and no electrical contact with every even numbered horizontal conduction line;
a second gate driver in electrical contact with every even numbered horizontal conduction line and no electrical contact with every odd numbered horizontal conduction line;
a plurality of vertical conduction lines;
a first source driver in electrical contact with every odd numbered vertical conduction line;
a second source driver in electrical contact with every even numbered vertical conduction line;
a first display interface board (DIB) in electrical contact with the first gate driver and first source driver; and
a second display interface board (DIB) in electrical contact with the second gate driver and second source driver;
wherein the second gate driver, second source driver, and second DIB operate simultaneously with the first gate driver, first source driver, and first DIB.

2. The redundant control system of claim 1 further comprising:
a first power supply in electrical communication with the first DIB; and
a second power supply in electrical communication with the second DIB.

3. The redundant control system of claim 1 further comprising:
a backlight positioned to illuminate the TFT array; and
a processor adapted to sense a failure in the first gate driver, first source driver, or first DIB and if so, increase the luminance produced by the backlight.

4. A redundant control system for a backlit TFT array comprising:
a plurality of horizontal conduction lines;
a first gate driver in electrical contact with only half of the horizontal conduction lines;
a second gate driver in electrical contact with only the remaining horizontal conduction lines that are not in electrical contact with the first gate driver;
a plurality of vertical conduction lines;
a source driver in electrical contact with the vertical conduction lines; and
a processor adapted to increase the luminance through the TFT array if the processor senses a failure in the first gate driver or second gate driver.

5. The redundant control system of claim 4 wherein:
the processor is adapted to turn off the failed driver and continue operations with the remaining driver if the processor senses a failure in the first gate driver or the second gate driver.

6. The redundant control system of claim 4 further comprising:
a redundant source driver in electrical contact with some of the vertical conduction lines.

7. The redundant control system of claim 6 wherein:
the processor is adapted to turn off the source driver and continue operations with the redundant source driver if the processor senses a failure in the source driver.

8. The redundant control system of claim 6 wherein:
the processor is adapted to turn off the source driver and continue operations with the redundant source driver if the processor senses a failure in the source driver,
continue operations with the second gate driver if the processor senses a failure in the first gate driver, and continue operations with the first gate driver if the processor senses a failure in the second gate driver.

9. The redundant control system of claim 6 wherein:
the processor is adapted to turn off the source driver and continue operations with the redundant source driver if the processor senses a failure in the source driver,
continue operations with the second gate driver and increase the luminance produced by the backlight if the processor senses a failure in the first gate driver, and
continue operations with the first gate driver and increase the luminance produced by the backlight if the processor senses a failure in the second gate driver.

10. A redundant control system for a TFT array comprising:
a plurality of horizontal conduction lines;
a first gate driver in electrical contact only with every other horizontal conduction line;
a second gate driver in electrical contact with only the horizontal conductions lines which are not in electrical contact with the first gate driver;
a plurality of vertical conduction lines;
a first source driver in electrical contact with only every other vertical conduction line;
a second source driver in electrical contact with only the vertical conduction lines which are not in electrical contact with the first source driver;
a backlight positioned to illuminate the TFT array; and
a processor adapted to increase the luminance produced by the backlight if the processor senses a failure in the first gate driver, the first source driver, the first source driver, or the second source driver.

11. The redundant control system of claim 10 further comprising:
a first display interface board (DIB) in electrical contact with the first gate driver and first source driver; and
a second display interface board (DIB) in electrical contact with the second gate driver and second source driver.

12. The redundant control system of claim 11 further comprising:
a first power supply in electrical communication with the first DIB; and
a second power supply in electrical communication with the second DIB.

13. The redundant control system of claim 12 wherein:
the processor is adapted to continue operations with the second source driver, the second DIB, and the second power supply if the processor senses a failure in the first source driver, the first DIB, or the first power supply.

14. The redundant control system of claim 12 wherein:
the processor is adapted to continue operations with the second source driver, the second DIB, and the second power supply while increasing the luminance produced by the backlight if the processor senses a failure in the first source driver, the first DIB, or the first power supply.

15. The redundant control system of claim 10 wherein:
the processor is adapted to continue operations with the second gate driver if the processor senses a failure in the first gate driver.

16. The redundant control system of claim 10 wherein:
the processor is adapted to continue operations with the second source driver if the processor senses a failure in the first source driver.

* * * * *